United States Patent
Melton

[15] 3,699,193
[45] Oct. 17, 1972

[54] PROCESS FOR PREPARATION OF DIALKYL VINYL PHOSPHATES
[72] Inventor: Thomas M. Melton, Richmond, Va.
[73] Assignee: Mobil Oil Corporation
[22] Filed: July 9, 1969
[21] Appl. No.: 840,490

[52] U.S. Cl.............260/969, 260/326.5 A, 260/941, 260/943, 260/957, 260/990
[51] Int. Cl.................................................C07f 9/08
[58] Field of Search.......260/990, 969, 941, 943, 957

[56] References Cited

UNITED STATES PATENTS 2,854,468  9/1958  Max..........................260/990

FOREIGN PATENTS OR APPLICATIONS 1,250,425  9/1967  Germany...................260/957

Primary Examiner—Joseph Rebold
Assistant Examiner—Anton H. Sutto
Attorney—Oswald G. Hayes, Andrew L. Gaboriault and Mitchell G. Condos

[57] ABSTRACT

In the preparation of dialkyl vinyl phosphates from trialkyl phosphites, the use of a selective saturated aliphatic hydrocarbon solvent reaction medium in which the reactants and product are soluble at reaction temperature, but in which the product is insoluble at lower temperatures enables isolation of the product by cooling and separation. Higher yields of vinyl phosphates from trialkyl phosphites are obtained, and time consuming product recovery distillation procedures are not required. Temperature conditions for the process of this invention fall within the range of 50° C to 200° C.

4 Claims, No Drawings

PROCESS FOR PREPARATION OF DIALKYL VINYL PHOSPHATES

BACKGROUND OF THE INVENTION

1. Field of the Invention

This invention relates to the process by which certain dialkyl vinyl phosphates are prepared. More particularly, it relates to a process for preparation of certain dialkyl vinyl phosphates from trialkyl phosphites and alpha-halo-substituted carbonyl compounds in a selective saturated aliphatic hydrocarbon solvent reaction medium.

2. Description of Prior Art

It is well known to those skilled in the art that many examples of the preparation of vinyl phosphates from trialkyl phosphites and alpha-halo-carbonyl compounds are found in the literature. Most of the examples are reactions carried out either without a solvent (U.S. Pat. No. 3,212,964; British Pat. No. 981,700) or using chlorobenzene or other aromatic hydrocarbons (U.S. Pat. No. 3,117,151; British Pat. No. 969,829) as solvents. Aliphatic hydrocarbons have been used as solvents (U.S. Pat. No. 3,117,908), but only when the product is soluble in the solvent.

SUMMARY OF THE INVENTION

This invention provides a process for preparation of certain dialkyl vinyl phosphates from trialkyl phosphites and alpha-halo-carbonyl compounds in a selective saturated aliphatic hydrocarbon solvent reaction medium which is soluble with the reactants and product at reaction temperature and insoluble with the product at temperatures below reaction temperature enabling product isolation and recovery by means, such as cooling, and separating the product as an insoluble oil or solid.

The process of this invention is applied to the manufacture of vinyl phosphates which have the general structure:

$$(RO)_2P(O)OCX=CYZ$$

wherein R is $CH_3$, $C_2H_5$, or $C_3H_7$; X is hydrogen, methyl,

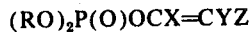, or

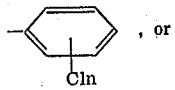

in which $n$ is an integer of 1, 2, or 3; Y is hydrogen or Cl; and Z is Cl, COOR, CONRH, or $CONR_2$, by reaction of trialkyl phosphites and alpha-halo-substituted carbonyl compounds of the general structure:

$$hal—CYZC(O)X$$

wherein hal is halogen; X is hydrogen, methyl,

or

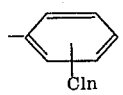

in which $n$ is an integer of 1, 2, or 3; Y is hydrogen or Cl; and Z is Cl, COOR, CONRH, $CONR_2$.

Solvents useful in the process of this invention are saturated straight or branched chain aliphatic hydrocarbons of $C_5$ to $C_{18}$ carbons (e.g., hexane, heptane, octane, nonane, decane, 2-methyl-heptane, 2-ethyl-heptane, etc.) chosen with reference to the reaction temperature desired (e.g., solvents of $C_8$–$C_9$ carbons are preferred for a 130°C reaction temperature).

Temperature conditions for the process of this invention fall within the range of 50°C to 200°C.

DESCRIPTION OF SPECIFIC EMBODIMENTS

Preparation of vinyl phosphates from trialkyl phosphites and alpha-halo-carbonyl compounds usually requires a solvent to obtain optimum yields. This is due to the fact that the vinyl phosphate product sometimes will catalyze decomposition of the trialkyl phosphites. As the reaction nears its end, the concentration of product becomes high in proportion to the concentration of the alpha-halo-carbonyl compound and catalytic decomposition becomes the dominant reaction. Addition of a solvent dilutes the product and tends to minimize the effect of this side reaction, leading to a higher overall product yield.

The use of a solvent has a disadvantage in that it should be removed from the product after the reaction is complete. In available patent literature, solvents used in these reactions have been those in which the reactants and products are soluble even at temperatures below reaction temperature. Thus, a distillation of the reaction mixture would be employed to remove the solvent. Expensive purification of recovered solvent is often required before it can be reused.

In the present invention, it has been found that certain vinyl phosphates are insoluble in saturated aliphatic hydrocarbons at temperatures below those at which such phosphates are produced by a reaction as aforediscussed, and for example, that such phosphates are insoluble in such hydrocarbons at normal, e.g., room, temperature. Thus, the product is easily isolated and may be recovered from the reaction mixture by cooling to cause separation of the solvent and product, and draining off the insoluble product layer. The separated solvent may then be reused without, if desired, further purification. The product can be purified by striping off a relatively small amount of volatile impurities and residual solvent.

Non-limiting examples of vinyl phosphates which can be prepared and easily recovered according to this invention are: 2-chloro-2-(diethylcarbamoyl)-1-methylvinyl dimethyl phosphate, U.S. Pat. No. 2,802,855, made by reaction of trimethyl phosphite with N,N-diethyldichloroacetoacetamide, $CH_3C(O)CCl_2C(O)N(C_2H_5)_2$; 2-(1-Phenylethoxycarbonyl)-1-methylvinyl dimethyl phosphate, U.S. Pat. No. 2,982,686, made by reaction of trimethyl phosphite with 1-phenylethyl chloroacetoacetate, $CH_3C(O)CHClC(O)OCH(C_6H_5)CH_3$; 2-Methoxycarbonyl-1-methylvinyl dimethyl phosphate, U.S. Pat. No.

2,685,552, made by reaction of trimethyl phosphite with methyl chloroacetoacetate, $CH_3C(O)CHClC(O)OCH_3$; 2-Dimethylcarbamoyl-1-methylvinyl dimethyl phosphate, U.S. Pat. No. 3,016,326, made by reaction of trimethyl phosphite with N,N-dimethylchloroacetoacetamide, $CH_3C(O)CHClC(O)N(CH_3)_2$; 2-methylcarbamoyl-1-methylvinyl dimethyl phosphate, U.S. Pat. No. 3,070,488, made by reaction of trimethyl phosphite with N-methylchloroacetoacetamide, $CH_3C(O)CHClC(O)NHCH_3$; 1-(2-Pyrrolidonyl)-2,2-dichlorovinyl dimethyl phosphate, U.S. Pat. No. 3,183,258, made by reaction of trimethyl phosphite with N-Trichloroacetyl-2-pyrrolidone; and 1-(2,4,5-Trichlorophenyl)-2,2-dichlorovinyl dimethyl phosphate, U.S. Patent No. 2,956,073, made by reaction of trimethyl phosphite with α, α, α, 2,4,5-hexachloroacetophenone.

The solvent medium hydrocarbons used in this invention are saturated straight or branched chain aliphatic with from $C_5$ to $C_{18}$ carbon atoms. Selection of the appropriate solvent is determined by the reaction temperature required. For example, if a reaction temperature of 130° C is required, octanes or nonanes are useful; for 100° C, heptanes; for 60° C, hexanes.

The present invention is especially adaptable to a continuous process for preparation of vinyl phosphates. In such a process, the trialkyl phosphite, the alpha-halo-carbonyl compound, and the saturated aliphatic hydrocarbon solvent of appropriate boiling point are continuously metered into a reactor maintained at the appropriate reaction temperature. The rates of addition and reactor sizing are sufficient to allow a complete reaction to be attained. A product stream is continuously withdrawn from the reactor, cooled to bring about separation of the solvent and product, and then led into a separator. The solvent is continuously withdrawn from the separator and returned to solvent storage. The separated product is continuously withdrawn and purified by stripping free of residual solvent and volatile impurities.

The following example demonstrates an embodiment for practice of this invention in the manufacture of 2-chloro-2-(diethylcarbamoyl)-1-methylvinyl dimethyl phosphate using octane as the solvent.

EXAMPLE

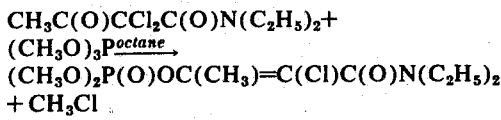

$(CH_3O)_2P(O)OC(CH_3)=C(Cl)C(O)N(C_2H_5)_2$
$+ CH_3Cl$

A 500 ml. 4 neck flask, equipped with a stirrer, reflux condenser, thermometer, and two 250 ml. addition funnels was initially charged with 3 g. of trimethyl phosphite and 95 ml. of octane, and flushed with nitrogen. The resulting octane trimethyl phosphite solution was heated via a glascol heating mantle to 80° C and 79 g. of N,N-diethyldichloroacetoacetamide was added with stirring over a period of 20 minutes. The reaction charge was then heated to 130° C and 52 g. of trimethyl phosphite was added over a period of 1 ½ hours. During the early stages of addition of the phosphite, the highest reflux temperature which could be maintained was 124°–125° C. because of the presence of a quantity of unreacted trimethyl phosphite. Evolution of methyl chloride began at once, and was 85 percent complete at the end of the trimethyl phosphite addition. Stirring was continued at 130° C for 1 ½ hours, after which 16.6 g. (94 percent yield) of methyl chloride had been collected.

The product-solvent medium separated into two layers on cooling to room temperature via a dry ice trap attached to the reflux condenser outlet. The top layer weighed 70.3 g. and had the following composition:

| | |
|---|---|
| trimethyl phosphite | 1.7 g. |
| dimethyl hydrogen phosphite | 0.1 g. |
| 2-chloro-2-(diethylcarbamoyl)-1-methylvinyl dimethyl phosphate | 3.5 g. |
| octane solvent | 65.0 g. |
| Total: | 70.3 g. |

The bottom layer weighed 122.0 g. and had the following composition:

| | |
|---|---|
| trimethyl phosphite | 3.8 g. |
| dimethyl hydrogen phosphite | 1.5 g. |
| 2-chloro-2-(diethylcarbamoyl)-1-methylvinyl dimethyl phosphate | 84.2 g. |
| octane solvent | 15.5 g. |
| high boiling inerts | 17.0 g. |
| Total: | 122.0 g. |

This product layer was stripped free of solvent on a rotary stripper at 100° C/5 mm for 15 minutes. 20.8 g. of distillate was obtained which separated into 15.4 g. of top phase and 5.4 g. of bottom phase. Analysis by iodometry and gas chromatography established the following compositions for those phases:

| | Top | Bottom |
|---|---|---|
| trimethyl phosphite | 1.1 g. | 0.5 g. |
| dimethyl hydrogen phosphite | 0.8 g. | 1.1 g. |
| octane solvent | 13.5 g. | 3.8 g. |
| Total: | 15.4 g. | 5.4 g. |

This top phase, combined with the top phase of the previous separation, may be used as solvent for subsequent reactions. This bottom phase was discarded. The product remaining after stripping weighted 100 g. (95.2 weight percent yield) and was 88.9 percent pure 2-chloro-2-(diethylcarbamoyl)-1-methylvinyl dimethyl phosphate.

Using the general procedure described in the example, other vinyl phosphates prescribed by the above generic formula and specifically the embodiments set forth may be prepared.

Although the present invention has been described with specific embodiments, it is to be understood that modifications and variations may be resorted to, without departing from the spirit and scope of the invention, as those skilled in the art will readily understand.

What is claimed is

1. In the process of manufacture of dialkyl vinyl phosphates of the structure:

$$(CH_3O)_2P(O)OCX=CYZ$$

wherein; X is hydrogen or methyl; Y is hydrogen or chlorine; and Z is $CONR_2$ wherein R is methyl or ethyl, by reaction of a trialkyl phosphite with an alpha-halo-substituted carbonyl compound at temperatures between 50° C and 200° C in the presence of a liquid reaction medium and recovery of the dialkyl vinyl phosphite from the reaction mixture, the improvement which comprises carrying out said reaction in a liquid reaction medium which is a saturated hydrocarbon that is liquid at reaction temperature, is a solvent for said reactants and said product at reaction temperature, and possesses reduced solvency for said reaction product at a temperature below reaction temperature, reducing the temperature of said reaction mixture comprising said reaction product to a temperature sufficiently low to separate the reaction product from the reaction mixture, and recovering said reaction product.

2. The process of claim 1 wherein the liquid medium is a normally liquid saturated aliphatic hydrocarbon.

3. The process of claim 2 wherein the liquid medium is a $C_5$ to $C_{18}$ saturated aliphatic hydrocarbon.

4. The process defined in claim 1 wherein the reaction product is the compound $(CH_3O)_2P(O)OC(CH_3)=C(Cl)C(O)N(C_2H_5)_2$, prepared by reacting trimethyl phosphite with N,N-diethyldichloroacetoacetamide in a medium comprising octane.

* * * * *